United States Patent [19]
Hirose et al.

[11] Patent Number: 5,313,571
[45] Date of Patent: May 17, 1994

[54] APPARATUS FOR STORING AND DISPLAYING GRAPHS

[75] Inventors: Akira Hirose; Yuji Ikeda; Katsuyuki Komatsu; Yoshihiro Saito; Yasushi Kohari, all of Kawasaki, Japan

[73] Assignee: Fuji Xerox Co., Ltd., Minato

[21] Appl. No.: 961,526

[22] Filed: Oct. 15, 1992

[30] Foreign Application Priority Data

Oct. 17, 1991 [JP] Japan .................. 3-269604

[51] Int. Cl.⁵ .............................. G06F 15/62
[52] U.S. Cl. ...................... 395/140; 395/133; 395/135; 395/139
[58] Field of Search ............ 395/140, 141, 133, 135, 395/139, 145-147, 161

[56] References Cited
U.S. PATENT DOCUMENTS
4,674,042  6/1987  Hernandez et al. ............ 395/140 X Primary Examiner—Heather R. Herndon
Assistant Examiner—Almis Jankus
Attorney, Agent, or Firm—Welsh & Katz, Ltd.

[57] ABSTRACT

In a graph generating device, when an input unit inputs data to be graphed, the data is stored in a data storage area through a processing control unit and a data generator. The data generator generates in a graph storage area element data for the graph elements based on the input data in the data storage area. A display control unit displays a graph on a display unit based on the data in the graph storage area. When the input unit directs the destination of a displayed graph element, coordinate data on the position of the destination is stored in a layout storage area through the processing control unit and a layout changing unit. The data generator 22 updates the element data in the graph storage area 43 based on the data in the data storage area 41 and the coordinate data in the layout storage area 42. The display control unit 24 updates and displays a graph on the display screen based on new element data in the graph storage area 43.

9 Claims, 16 Drawing Sheets

| AREA | SALES AMOUNT (BILLION) |
|---|---|
| A | 80 |
| B | 210 |
| C | 160 |

| IDENTIFIER | LABEL | VALUE |
|---|---|---|
| id1 | A | 80 |
| id2 | B | 210 |
| id3 | C | 160 |

|  |  |
|---|---|
| POSITION | [x:10,y:0] |
| SIZE | [w:6,h:32] |
| SHADE | ⧛⧛⧛ |
| IDENTIFIER | Id1 |

43-A

|  |  |
|---|---|
| POSITION | [x:20,y:0] |
| SIZE | [w:6,h:84] |
| SHADE | ⧛⧛⧛ |
| IDENTIFIER | Id2 |

43-B

|  |  |
|---|---|
| POSITION | [x:30,y:0] |
| SIZE | [w:6,h:64] |
| SHADE | ⧛⧛⧛ |
| IDENTIFIER | Id3 |

43-C

|  |  |
|---|---|
| POSITION | [x:0,y:0] |
| SIZE | [w:4,h:100] |
| SHADE | ⊔⊔⊔⊔⊔⊔ |
| IDENTIFIER | Id4 |

43-D

| IDENTIFIER | LAYOUT DATA |
|---|---|
| id1 | nil |
| id2 | nil |
| id3 | nil |
| id4 | nil |

| IDENTIFIER | LAYOUT DATA |
|---|---|
| Id1 | nll |
| Id2 | nll |
| Id3 | [x:52,y:31] |
| Id4 | nll |

FIG.14

43-A
| POSITION | [x:10,y:0] |
|---|---|
| SIZE | [w:6,h:32] |
| SHADE | |
| IDENTIFIER | Id1 |

43-B
| POSITION | [x:20,y:0] |
|---|---|
| SIZE | [w:6,h:84] |
| SHADE | |
| IDENTIFIER | Id2 |

43-C
| POSITION | [x:52,y:31] |
|---|---|
| SIZE | [w:6,h:64] |
| SHADE | |
| IDENTIFIER | Id3 |

43-D
| POSITION | [x:0,y:0] |
|---|---|
| SIZE | [w:4,h:100] |
| SHADE | |
| IDENTIFIER | Id4 |

FIG.15

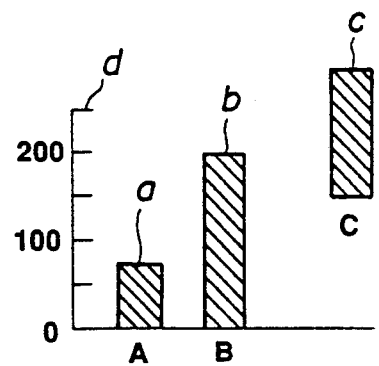
FIG.16
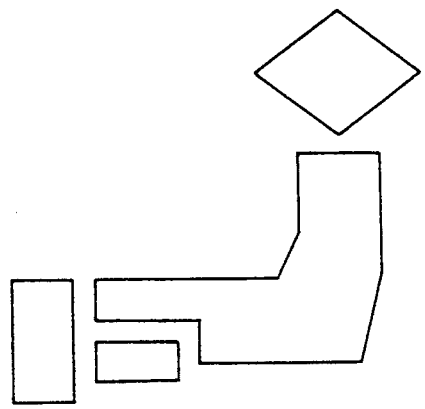
FIG.17
| IDENTIFIER | LAYOUT DATA |
|---|---|
| id1 | [x:-20,y:60] |
| id2 | [x:-30,y:8] |
| id3 | [x:-51,y:8] |
| id4 | [x:-5,y:5] |
FIG.18

| | | |
|---|---|---|
| 43-A | POSITION | [x:-20,y:60] |
| | SIZE | [w:6,h:32] |
| | SHADE | |
| | IDENTIFIER | Id1 |

| | | |
|---|---|---|
| 43-B | POSITION | [x:-30,y:8] |
| | SIZE | [w:6,h:84] |
| | SHADE | |
| | IDENTIFIER | Id2 |

| | | |
|---|---|---|
| 43-C | POSITION | [x:-51,y:8] |
| | SIZE | [w:6,h:64] |
| | SHADE | |
| | IDENTIFIER | Id3 |

| | | |
|---|---|---|
| 43-D | POSITION | [x:-5,y:5] |
| | SIZE | [w:4,h:100] |
| | SHADE | |
| | IDENTIFIER | Id4 |

| IDENTIFIER | LABEL | VALUE |
|---|---|---|
| Id1 | A | 80 |
| Id2 | B | 110 |
| Id3 | C | 220 |

FIG.21

43-A
| POSITION | [x:-20,y:60] |
|---|---|
| SIZE | [w:6,h:32] |
| SHADE | |
| IDENTIFIER | Id1 |

43-B
| POSITION | [x:-30,y:8] |
|---|---|
| SIZE | [w:6,h:44] |
| SHADE | |
| IDENTIFIER | Id2 |

43-C
| POSITION | [x:-51,y:8] |
|---|---|
| SIZE | [w:6,h:88] |
| SHADE | |
| IDENTIFIER | Id3 |

43-D
| POSITION | [x:-5,y:5] |
|---|---|
| SIZE | [w:4,h:100] |
| SHADE | |
| IDENTIFIER | Id4 |

FIG.22

| | POSITION | [x:-20,y:60] |
|---|---|---|
| 43-A | SIZE | [w:3,h:16] |
| | SHADE | ▨ |
| | IDENTIFIER | Id1 |

| | POSITION | [x:-30,y:8] |
|---|---|---|
| 43-B | SIZE | [w:3,h:22] |
| | SHADE | ▨ |
| | IDENTIFIER | Id2 |

| | POSITION | [x:-51,y:8] |
|---|---|---|
| 43-C | SIZE | [w:3,h:44] |
| | SHADE | ▨ |
| | IDENTIFIER | Id3 |

| | POSITION | [x:-5,y:5] |
|---|---|---|
| 43-D | SIZE | [w:2,h:50] |
| | SHADE | ⊔⊔⊔⊔⊔⊔ |
| | IDENTIFIER | Id4 |

APPARATUS FOR STORING AND DISPLAYING GRAPHS

BACKGROUND OF THE INVENTION

1. Field of the Invention

The present invention relates to graph generating devices which automatically generate a graph based on given data and more particularly to a graph generating device capable of changing graph elements at moved positions when data corresponding to the graph elements are updated after the graph elements are moved to desired positions.

2. Description of the Related Art

A conventional graph generating device is capable of generating predetermined kinds of graphs. When a data is given, the graph generating device generates a graph corresponding to the given data. For example, a device having a function of generating a bar graph, generates and displays a bar graph such as shown in FIG. 32 when data A1, B1 and C1 are given corresponding to bars (graph element) which constitute the bar graph.

Some conventional devices may also have the function of editing the graph thus generated. With these devices, the bars a, b and c of the bar graph shown in FIG. 32 can be laid out and displayed on, for example, a map of Japan as shown in FIG. 33.

In these conventional device, however, the bars a, b and c are only moved or copied to desired positions in the editing operation. Thus, when the data A1, B1 and C1 are changed or updated, these data must be changed in the bar graph of FIG. 32 and then the resulting new bars a, b and c are laid out on the map shown in FIG. 33.

A device has been proposed which is capable of moving a graph element freely to any position (published unexamined Japanese patent application Hei 3-74783). However, this device only moves, for example, the label of a graph and therefore cannot update graph data while displaying graph elements corresponding to the data at any position on the display unit.

As described above, these conventional graph generating devices can move the displayed graph elements to desired positions. However, each time data for the graph elements are updated, it is necessary to generated a graph according to the updated data and then again layout the graph elements to desired positions.

SUMMARY OF THE INVENTION

It is an object of the present invention to provide a graph generating device capable of changing graph elements at moved positions when data corresponding to the graph elements are updated after the graph elements are moved to desired positions.

To achieve the above object, a graph generating device according to the present invention comprises a rewritable memory for storing display position data and display size data corresponding to numerical data for each graph element constituting a graph; a display control unit for controlling the display to display the graph elements on the display based on the data stored in the memory; position directing unit for directing a new display position of a desired one of the graph elements displayed on the display; and position control means for updating display position data in the memory based on the display position directed by the position directing unit.

In the graph generating device of the above construction, when the stored data in the memory is updated, display controlling means causes a display to re-display the graph based on the updated stored data.

Thus, even if the numerical data is updated after the display position of a graph element is changed, the graph element can be changed in accordance with the new numerical data and the resulting graph element can be re-displayed without directing the display position of the graph element.

Other objects and advantages of the present invention can be easily confirmed from the following detailed description and the accompanying drawings.

BRIEF DESCRIPTION OF THE DRAWINGS

FIG. 14 shows updated data in the layout storage area of FIG. 5;

FIG. 15 shows updated data in the graph storage area of FIG. 4;

FIG. 16 is a bar graph of FIG. 6 updated on a display screen;

FIG. 17 shows a map of Japan displayed on the display screen;

FIG. 18 shows updated data in the layout storage area of FIG. 14;

FIG. 21 shows updated data in the data storage area of FIG. 3;

FIG. 22 shows updated data in the graph storage area of FIG. 19;

DESCRIPTION OF THE PREFERRED EMBODIMENTS

Embodiments of the present invention will be described in detail with respect to the accompanying drawings.

Figures 1, 2, 3:
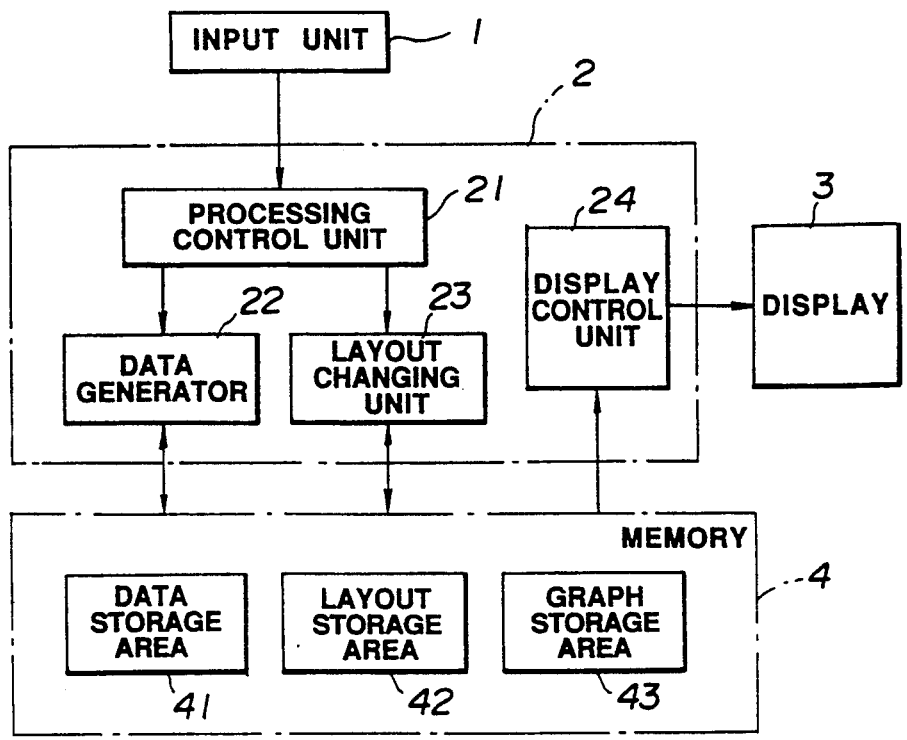
FIG. 1 is a block diagram of an embodiment of a graph generating device according to the present invention.
FIG. 2 shows data to be graphed.
FIG. 3 shows data in a data storage area of the memory in the graph generating device.

FIG. 1 is a block diagram of one embodiment of a graph generating device according to the present invention. In FIG. 1, the graph generating device is provided with an input unit 1, a control unit 2, a display 3 and a memory 4.

The input unit 1 includes a keyboard or a mouse (pointing unit) used to input various data and commands. The control unit 2 includes a processing control unit 21, a data generator 22, a layout changing unit 23, and a display control unit 24. The processing control unit 21 transfers data or a command from the input unit 1 to the data generator 22 or the layout changing unit 23 according to the contents of the data or command.

Figures 4, 5, 6:
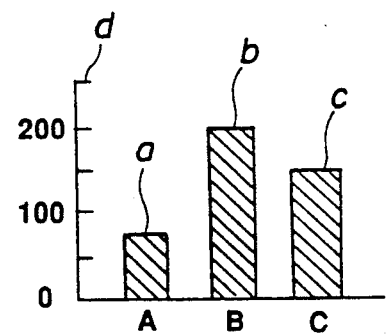
FIG. 4 shows data in a graph storage area of the memory in the graph generating device.
FIG. 5 shows data in a layout storage area of the memory in the graph generating device.
FIG. 6 shows a bar graph displayed on the display in the graph generating device.

The data generator 22 generates a data table having items of "identifier", "label" and "value" as shown in FIG. 3 based on input data consisting of items, "label" and "value", for example, as shown in FIG. 2. When there is a request for display of data in the form of a graph, the data generator 22 generates element data as shown in FIG. 4 corresponding to graph elements. It also generates a layout data table having records consisting of items of "identifier" and "layout data" as shown in FIG. 5.

A data table such as is shown in FIG. 3 is stored in a data area 41. A group of element data such as is shown in FIG. 4 is stored in a graph storage area 43. A layout data table such as is shown in FIG. 5 is stored in a layout storage area 42. The data table, element data group and layout data table form graph data necessary for generating and displaying a graph.

Having received a layout change command, the layout changing unit 23 changes the contents of the layout data on the layout data table of FIG. 5 stored in the layout storage are 42.

When the layout is changed, the data generator 22 changes the element data group of FIG. 4 stored in the graph storage area 43 based on the layout data table on the layout storage area 42.

The display control unit 24 generates a graph such as shown in FIG. 6 based on the element data group shown in FIG. 4 stored in the graph storage area 43 and causes the display 3 to display the graph on its display screen. During the generation of graph, the data table stored in the data storage area 41 and the layout data table stored in the layout storage area 42 are referred to.

In this embodiment, the data which is inputted to be graphed is defined as input data. A data item, "value" on the data table stored in the data storage area 41 is defined as numerical data. The elements which constitute a graph appearing on the display screen of the display 3 is defined as graph elements. In the case of a bar graph, the bar, X-axis, Y-axis and a scale are graph elements. Data indicative of a graph to be displayed is defined as graph data, while the data indicative of a graph element is defined as element data. To display the graph elements, the record on the data table and the layout data table are referred to in addition to the data elements.

Figure 7:
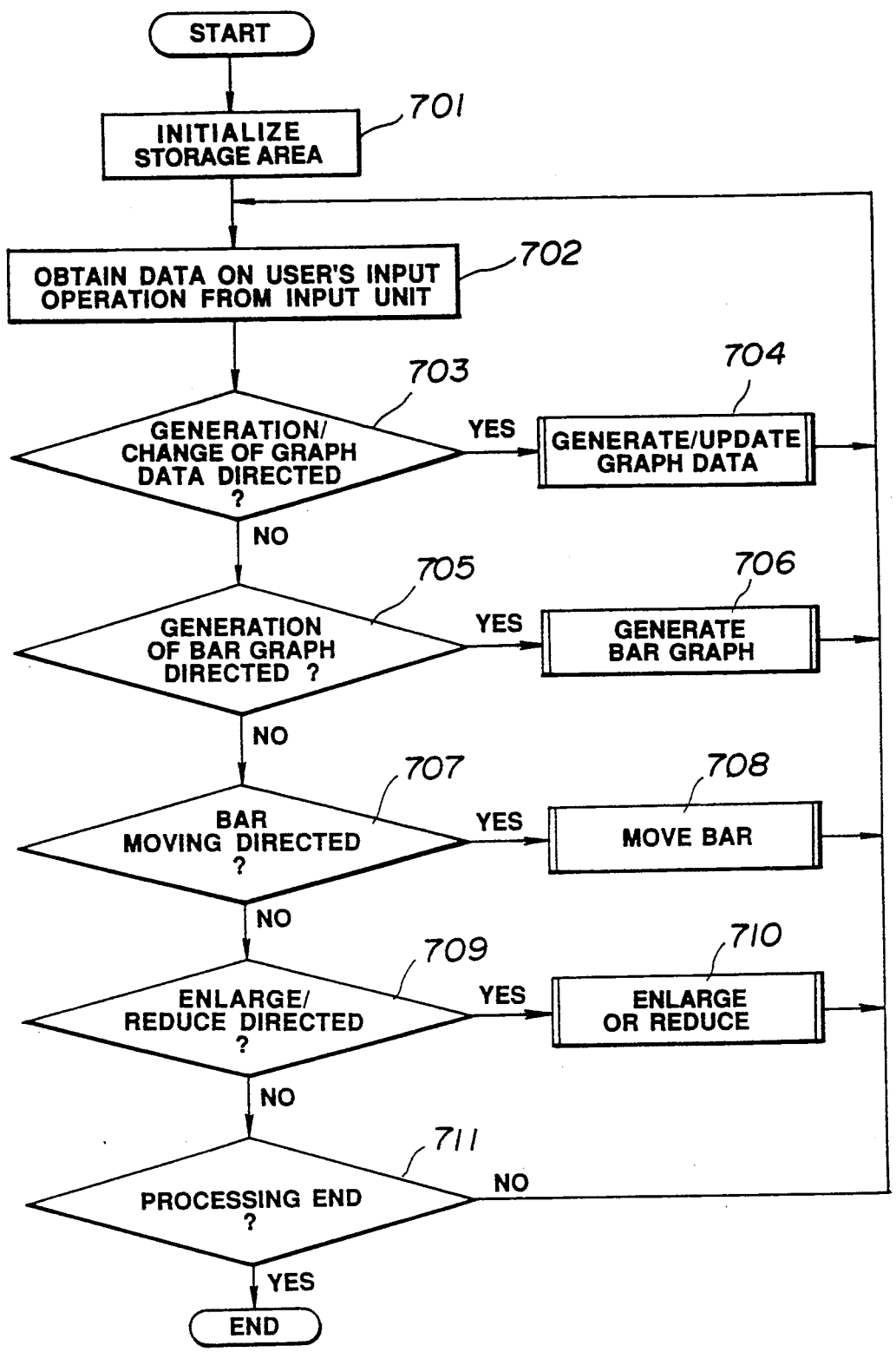
FIG. 7 is a flowchart illustrating the overall flow of graph generating by the graph generating device.

FIG. 7 shows the overall flow of the graph generation by the graph generating device of this embodiment.

Referring to FIG. 7, the control unit 2 initialize the storage area in the memory 4 (step 701), and then receives inputting operation data through the input unit 1 from a user (step 702). The control unit 2 determines whether the input data is a graph data generation/update command or not (step 703).

If so at step 703 (i.e., if the control unit 2 determines that the input data is a graph data generation/update command), the control unit 2 generates or updates graph data (step 704). Otherwise, it determines whether the input data is a bar graph generation command (step 705).

If so at step 705, the control unit 2 preforms a bar graph generating processing (step 706). Otherwise, it determines whether the input data is a bar moving command (step 707).

If so at step 707, the control unit 2 performs a bar moving processing (step 708). Otherwise, it determines whether the input data is an enlargement/reduction command (step 809).

If so at step 809, the control unit performs enlargement or reduction (step 710). Otherwise, it determines whether the input data is a processing termination command (step 711).

If the input data is not the processing termination command, the control unit returns to step 712 and executes step 712 seqq. If the input data is the processing termination command, the control unit terminates the processing.

Figure 8:
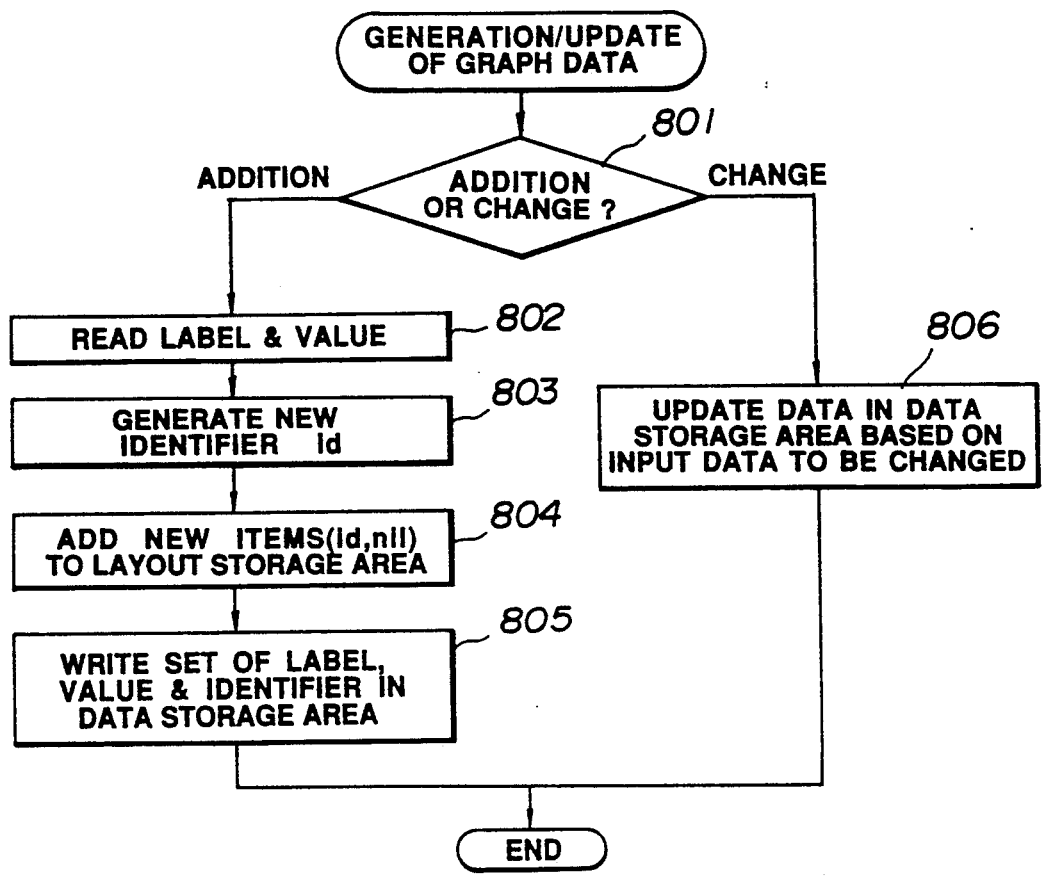
FIG. 8 is a flowchart illustrating the update and processing of graph data by a data generating unit.

Generation and update of graph data by the data generator 22 will next be described with respect to the flowchart of FIG. 8.

The data generator 22 determines whether a required processing is a new additional processing or a data updating processing (step 801).

If a new additional processing is required, the control unit reads label and value, for example, from the input data shown in FIG. 2 (step 802) and generates a new identifier id corresponding to the read value (step 803). The data generator 22 generates a layout data table having records consisting of items "identifier" and "layout data", for example, as shown in FIG. 5 and stores the table in the layout storage area 42 (step 804). In the layout data table, the number of the records is equal to the sum of the number of labels in the input data and "1".

Having completed step 804, the data generator 22 generates a data table with records consisting of items of identifiers, labels and values, as shown in FIG. 3, and stores the table in the data storage area 41 (step 805). In the data table, the number of records is equal to the number of labels in the input data. When the layout data table is newly generated, (nil) is set as an initial value in the layout data.

If a required operation is the data updating operation at step 801, the data generator 22 updates the data on the data table in the data storage area 41 in accordance with the user input data (step 806).

Figure 9:
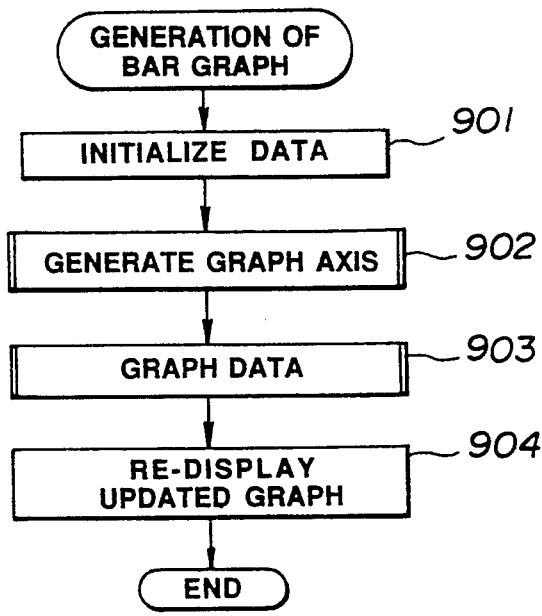
FIG. 9 is a flowchart illustrating the generation of a bar graph by the data generating unit.

Generation of a bar graph by the data generator 22 will now be described with respect to the flowchart of FIG. 9.

The data generator 22 initializes data (step 901), and then executes the processing for generation of graph axes (step 902) and the processing for graphing of data (step 903). The display control unit 24 displays the graph on the display 3 based on the result of the processing for the graph axis generation and graphing of data (step 904).

Figure 10:
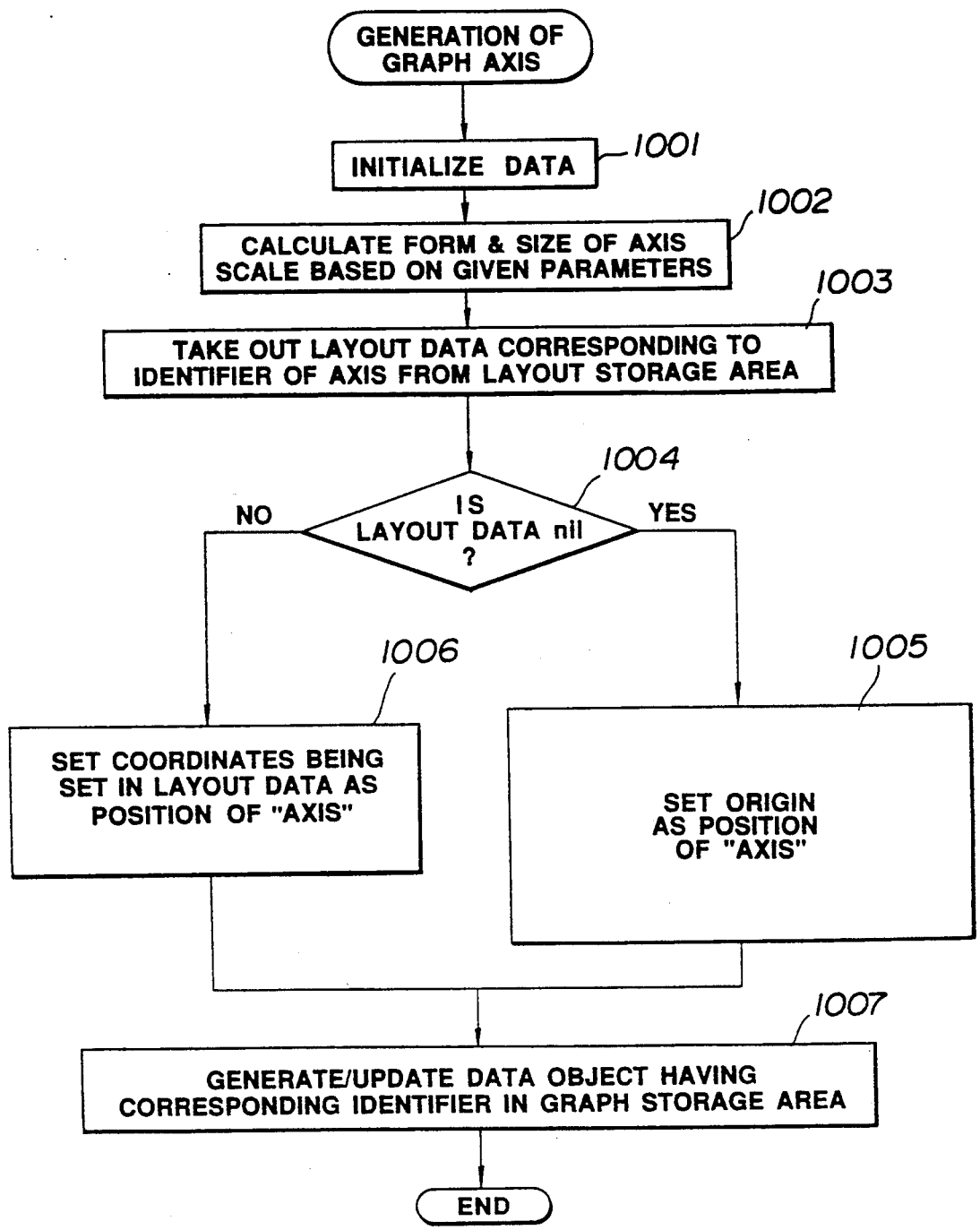
FIG. 10 is a flowchart illustrating the generation of a graph axis by the data generating unit.

Generation of graph axes by the data generator 22 will be described with respect to the flowchart of FIG. 10.

The data generator 22 initializes data (step 1001), calculates the axes and the form and magnitude of scales based on parameters input by the input unit 1 through the processing control unit 21 (step 1002), takes out layout data corresponding to an identifier indicative of graph element "axis" from the layout data table in the layout storage area 42 (step 1003), and determines whether the taken-out data is "nil" (step 1004).

If so at step 1004, predetermined coordinates such as the origin of the coordinate axes are set as the position of the "axis" (step 1005). If the answer is NO at step 1004, the coordinates set in the layout data are set as the position of the "axis" (step 1006).

Having completed step 1005 or 1006, the data generator 22 generates a data object with an identifier for the graph element "axis" in the graph area 43 based on the results of processing at steps 1002 and 1005 or 1006, when required, while it updates a data object with an identifier for the graph element "axis" stored in the graph area 43 based on the results of processing at steps 1002 and 1005 or 1006, when required (step 1007).

Figure 11:
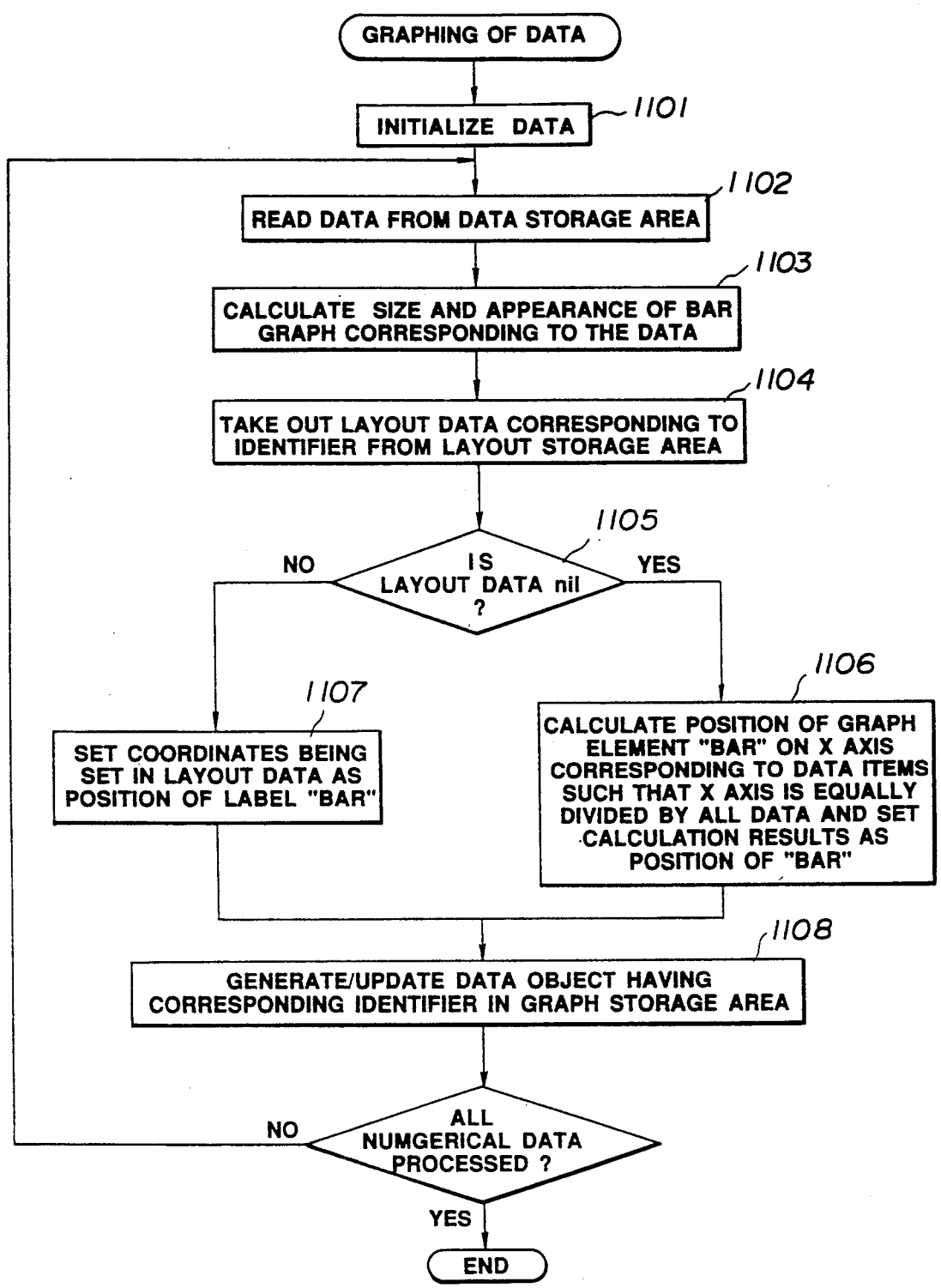
FIG. 11 is a flowchart illustrating graphing of data by the data generating unit.

Graphing of data by the data generator 22 will be described with respect to the flowchart of FIG. 11.

The data generator 22 initializes data (step 1101), then reads out numerical data from the data table in the data storage area 41 (step 1102), and calculates the size and appearance of graph bar representing the read numerical values (step 1103). It then takes out from the layout data table in the layout storage area 42 the layout data corresponding to the identifier of the graph element "bar" (step 1104), and determines whether the taken-out layout data is "nil" (step 1105).

If so, the data generator 22 calculates the positions of graph element "bar" on the X axis corresponding to the data items "values" stored on the data table stored in the data storage area 41 such that the X axis is equally divided by the number of data items "values", and sets the result of the calculation as the positions of the graph element "bar" (step 1106). If the answer is NO at step 1105, it sets the coordinates set in the layout data as the positions of the graph element "bar" (step 1107).

Having completed step 1006 or 1007, the data generator 22 generates a data object in the graph area 43 based on the results of processing at steps 1003 and 1006 or 1007 in the case of generating new graph data. In the case of updating graph data, the data generator 22 updates a data object having an identifier for the graph element "bar" stored in the graph area 43 based on the results of processing at steps 1003 and 1006 or 1007 (step 1008).

Thereafter, the data generator 22 determines whether the processing of all the items "values" on the data table stored in the data storage area 41 has completed (step 1109).

If the answer is NO at step 1109, the generator 22 returns to step 1102 and executes step 1102 seqq. If YES at step 1109, the generator 22 terminates the graphing operation.

Figure 12:
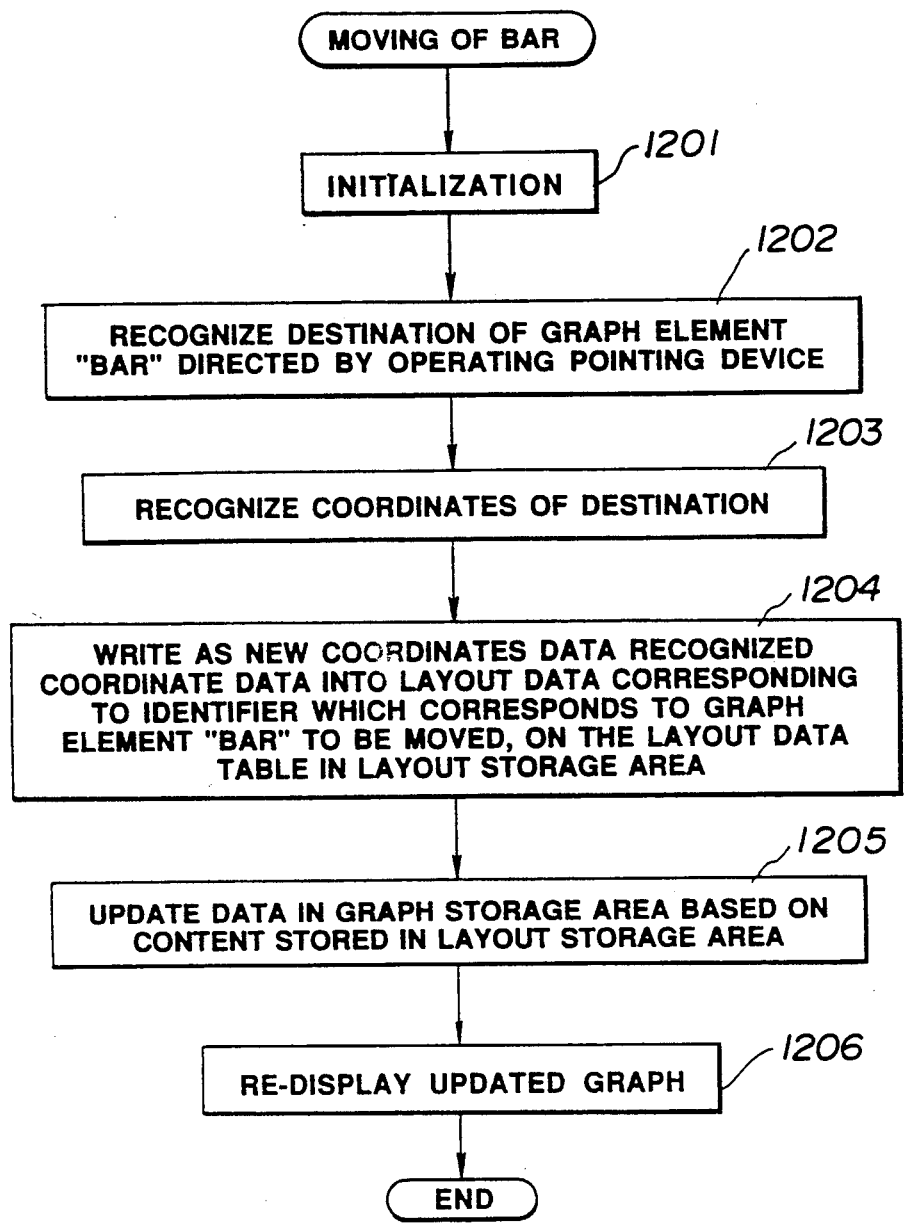
FIG. 12 is a flowchart illustrating bar movement by a control unit.

The processing for moving graph element "bar" by the control unit 2 will next be described with respect to the flowchart of FIG. 12.

The layout changing unit 23 initializes data (step 1201), then operates a pointing device (mouse) provided on the input unit 1 to recognize the directed destination of a graph element "bar" (step 1202), and the coordinates of the destination (step 1203). It writes data on the recognized destination coordinates as new coordinate data into layout data corresponding to an identifier which in turn corresponds to the graph element "bar", to be moved, on the layout data table in the layout storage area 42 (step 1204).

The data generator 22 updates the coordinates data in the graph data storage area 43 based on data in the layout storage area 42 (step 1205). The display control unit 24 generates a graph based on the data stored in the graph storage area 43 and re-displays it on the display 3 (step 1206).

Enlargement/reduction processing performed by the control unit 2 will be described with respect to the flowchart of FIG. 13.

Figure 13:
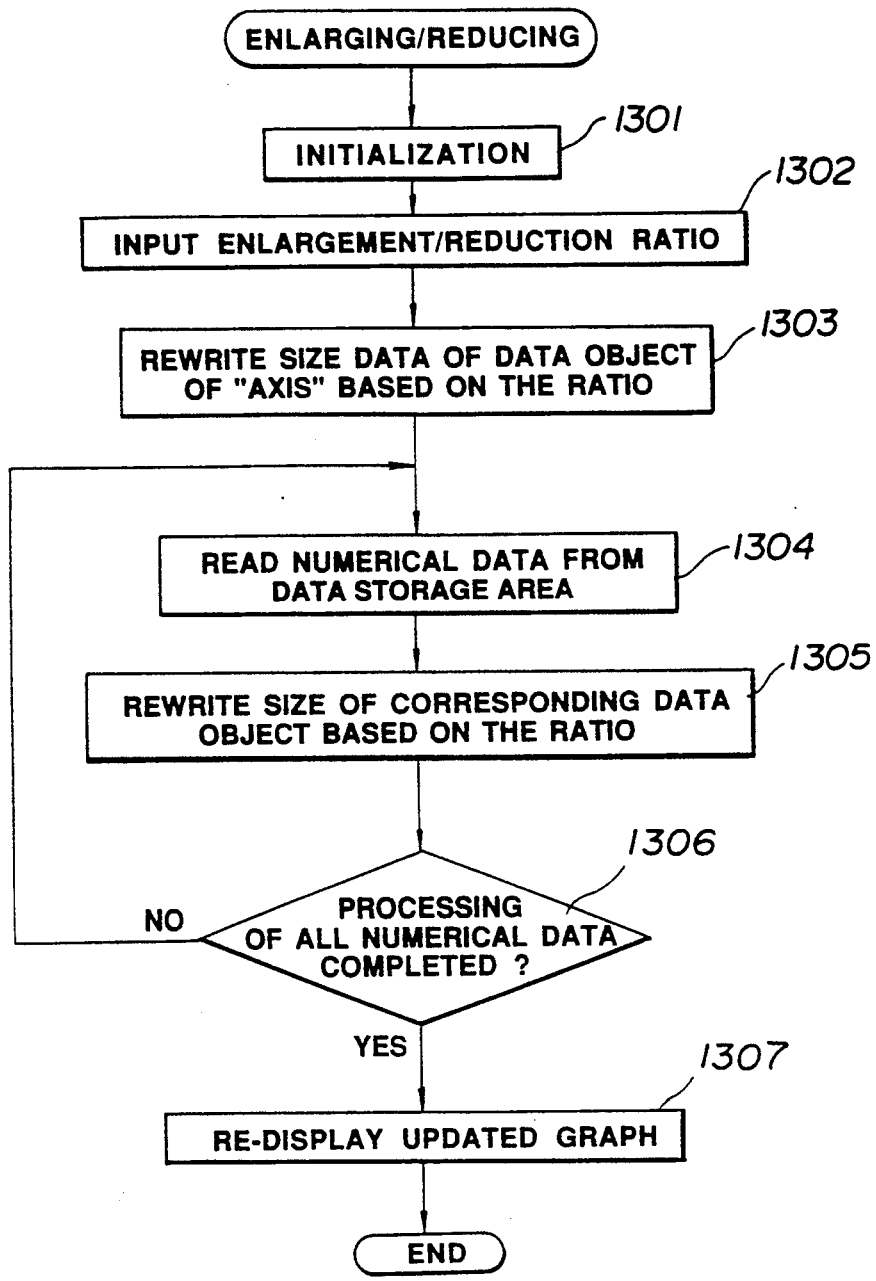
FIG. 13 is a flowchart illustrating enlargement and reduction by the control unit.

Referring to FIG. 13, the layout changing unit 23 initializes data (step 1301), obtains data on an enlargement or reduction ratio received through the processing control unit 21 from the input unit 1 (step 1302) and rewrites data on the size of the data object of the graph element "axis" in the graph storage area 43 based on the data on the enlargement or reduction (step 1303).

The layout changing unit 23 reads out numerical data from the data storage area 41 (step 1304), calculates data based on the numerical data and the data on the ratio and rewrites the data on the size of the appropriate data object in the graph storage area 43 based on the result of the calculation (step 1305). The layout changing unit 23 determines whether the processing of all the data items "values" on the data table stored in the data storage area 41 (step 1307).

If not, the layout changing unit 23 returns to step 1304 and executes the step 1304 seqq. If YES at step 1307, the display controlling unit 24 re-displays the graph on the display 3 based on the data in the graph storage area 43 (step 1308).

The above processing will now be described in detail by way of a specified example. First, generation of graph data will be described by way of an example. When data such as is to be expressed in a graph and shown in FIG. 2 is input by operating the input unit 1, the data is delivered through the processing control unit 21 to the data generator 22, which forms on those data a table such as shown in FIG. 3 in the data storage area 41 in the storage unit 4.

In the FIG. 3 data table, the identifiers id1, id2 and id3 are given to numerical data Ad, Bd and Cd corresponding to the areas A, B and C. The labels denote the names of the areas A, B and C. The values of the numerical data include the values of numerical data Ad, Bd and Cd, which are "80", "210" and "160", respectively.

Generation of a bar graph will next be described by way of a specified example.

When expression of the numerical data Ad, Bd and Cd, for example, in a bar graph is requested by the operation of the input unit 1, this request is reported to the data generator 22 through the processing control unit 21. In response to this, the data generator 22 forms in the graph storage area 43 of the memory 4 element data such as is shown in FIG. 4 to express the numerical data Ad, Bd and Cd in the bar graph.

In FIG. 4, the data objects 43-A, 43-B and 43-C are generated respectively corresponding to the numerical data Ad, Bd and Cd and each consists of coordinates indicative of the position of a graph element "bar" in the bar graph, the size and shape of a bar indicative of the value of numerical data, and an identifier given to the numerical data arranged in this order. The data object 43-D is for a scale of the bar graph and consists of coordinates indicative of the position of a graph element "scale" in the bar graph, the size and shape of the scale and an identifier indicative of the scale arranged in this order.

When each such data object is formed in the graph storage area 43, the display controlling unit 24 displays on the screen of the display 3 a bar graph such as is shown in FIG. 6 based on the data objects in the graph storage area 43.

In the bar graph of FIG. 6, a bar a is generated based on the data object 43-A corresponding to the numerical data Ad, and displayed on the screen at the position of the coordinates (10, 0) in the form of a rectangle of "6" in width and "32" in height. A bar b is generated based on the data object 43-B corresponding to the numerical data Bd, and displayed on the screen at the position of the coordinates (20, 0) in the form of a rectangle of "6" in width and "84" in height. A bar c is generated based on the data object 43-C corresponding to the numerical data Cd, and displayed on the screen at the position of the coordinates (30, 0) in the form of a rectangle of "6" in width and "64" in height. The scale d is generated based on the data object 43-D corresponding to the numerical data D, and displayed on the screen at the position of the coordinates (0, 0) in the form of a scale of "4" in width and "100" in height.

The coordinates, and the widths and heights of bars are determined in correspondence to one pixel and the value "1".

In the generation of such bar graph, the data generator 22 also generates a layout table such as is shown in FIG. 5 in the layout storage area 42 of the memory 4.

Disposed in order in the layout table of FIG. 5 are the identifiers id1, id2, id3 and id4 indicative of the data Ad, Bd, Cd, and the scale, respectively, and columns which store layout data in correspondence to those data items. When a bar or a coordinate on the scale is directed, the coordinate is entered in a column where layout data corresponding to an identifier is to be entered.

Since the coordinate of each of the bars a, b and c and the scale d in the graph of FIG. 6 is not especially directed here, "nil" is entered into each of the columns corresponding to the identifiers id1, id2, id3 and id4.

Moving the graph element "bar" will next be described by way of an example.

The position of the bar c in the bar graph of FIG. 6 displayed on the display screen is the coordinates in the data object 43-C shown in FIG. 4. When a new position of the bar c is directed by operating the input unit 1, the position of this new position is reported to through the processing control unit 21 to the layout changing unit 23. Assume that the coordinates of the new position of the bar c are (52, 31).

The layout changing unit 23 which has received the report from the processing control unit 21 writes the coordinates (52, 31) into a column corresponding to the identifier id3 indicative of the bar c on the layout data table in the layout storage area 42. Thus, the data of the layout data table in FIG. 4 in the layout storage area 42 is changed to the data in FIG. 14. Subsequently, the processing control unit 21 starts up the data generator 22.

The data generator 22 then updates the data in the graph storage area 43 shown in FIG. 43 based on the data in the data storage area 41 of FIG. 3 and the data in the graph storage area 43 of FIG. 4. As a result, the data in the graph storage area 43 becomes that of FIG. 15.

That is, since the coordinates (52, 31) are written as shown in FIG. 14 in a column corresponding to the identifier id3 on the layout data table in the layout storage area 42, the coordinates in the data object 43-C containing the identifier id3 in the graph storage area 43 are updated from (30, 0) to (52, 31). Since "nil" is written in the columns corresponding to other identifiers id1, id2 and id4, as shown in FIG. 14, the coordinates in the other data objects 43-A, 43-B and 43-D containing other identifiers id1, id2 and id4, respectively, in the graph storage area 43 are not updated.

When the value of at least one data object in the graph storage area 43 is updated, the display controlling unit 24 updates the bar graph displayed on the display screen based on the data objects in the graph storage area 43. Thus a new bar graph such as is shown in FIG. 16 is displayed on the screen.

As shown in FIG. 16, since the coordinates in the data object 43-C containing the identifier id3 in the graph storage area 43 are updated to (52, 31), the bar c indicative of the value of the numerical data cd with the given identifier id3 is positioned at coordinates (52, 31).

If a map such as a map of Japan shown in FIG. 17 is displayed on the display screen on which the bar graph of FIG. 16 is also displayed, and the new positions of the bars a, b and c and the scale d shown in FIG. 16 are especially directed, the bars a, b and c and scale d are moved onto the map.

When the input unit 1 is operated to direct the new positions of the bars a, b, c and scale d, this operation is reported through the processing control unit 21 to the layout changing unit 23, and the layout changing unit 23 writes the respective coordinates indicative of the new positions into the layout data table in the layout storage area 42. Assume here that the coordinates indicative of the new positions of the bars a, b, c and scale d are $(-20, 60)$, $(-30, 8)$, $(-51, 8)$ and $(-5, 5)$.

Thus, the new positions $(-20, 60)$, $(-30, 8)$, $(-51, 8)$ and $(-5, 5)$ of the bars a, b, c and scale d are written in correspondence to the identifiers id1, id2, id3 and id4, respectively, onto the layout data table, as shown in FIG. 18.

Figures 19, 20:
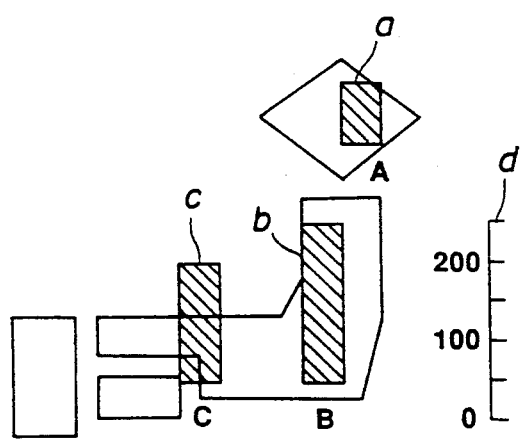
FIG. 19 shows updated data in the graph storage area of FIG. 15.
FIG. 20 shows a graph newly generated on the display screen.

Subsequently, the data generator 22 is started up to update the data in the graph storage area 43 of FIG. 15 on the basis of the data in the data storage area 41 of FIG. 3 and the data in the layout storage area 42 of FIG. 18 to thereby form data such as is shown in FIG. 19 in the graph storage area 43. In FIG. 19, the coordinates in the data object 43-A containing the identifier id1 are updated to (−20, 60); the coordinates in the data object 43-B containing the identifier id2 are updated to (−30, 8); the coordinates in the data object 43-C containing the identifier id3 are updated to (−51, 8); and the coordinates in the data object 43-D containing the identifier id4 are updated to (−5, 5).

The display control unit 24 updates a bar graph displayed on the display screen based on the data objects in the graph storage area 43 and displays on the screen a new graph such as is shown in FIG. 20, in which a bar a corresponding to the identifier id1 is positioned at coordinates (−20, 60) in the data object 43-A containing the identifier id1; a bar b corresponding to the identifier id2 is positioned at coordinates (−30, 8) in the data object 43-B containing the identifier id2; a bar c corresponding to the identifier id3 is positioned at coordinates (−51, 8) in the data object 43-C containing the identifier id1; and a scale d corresponding to the identifier id4 is positioned at coordinates (−5, 5) in the data object 43-D containing the identifier id4.

Therefore, by especially directing on the screen the positions of bars and scales which constitute a bar graph after the bar graph is displayed on the screen, the directed positions are entered on the layout data table in the layout storage area 42, the coordinates in the graph storage area 43 are updated based on the positions in the layout data table and hence the bars and scale are moved to the directed positions on the screen.

Update of graph data will be described by way of an example.

It is premised here that the values of numerical data Bd and Cd corresponding to the heights of bars b and c are updated in the state of FIG. 20 where the bars a, b and c and scale d are displayed on a map of Japan.

When new values of the numerical data Bd, Cd are input by operating the input unit 1, those new values are delivered through the processing control unit 21 to the data generator 22, which then updates the data table in the data storage area 41 based on the new values of the numerical data. For example, if "110" and "220" are input as the new values of the numerical data Bd and Cd, the data on the data table in the data storage area 41 is updated from the data of FIG. 3 to that of FIG. 21, in which the value of the numerical data Bd is updated with "110" and the value of the numerical data Cd with "220".

Subsequently, the data generator updates data in the graph storage area 43 of FIG. 19 based on data in the data in the data storage area 41 of FIG. 21 and data in the data in the layout storage area 42 of FIG. 18. As a result, the data in the graph storage area 43 is updated from the data of FIG. 19 to that of FIG. 22, in which since the numerical data Bd shown by the identifier id2 is updated to a new value "110", the height of the bar b in the data object 43-B containing the identifier id2 is updated with a value "44" corresponding to the new value "110". Similarly, since the numerical data Cd shown by the identifier id3 is updated to a new value "220", the height of the bar c in the data object 43-C containing the identifier id3 is updated with a value "88" corresponding to the new value "220".

Figures 23, 24:
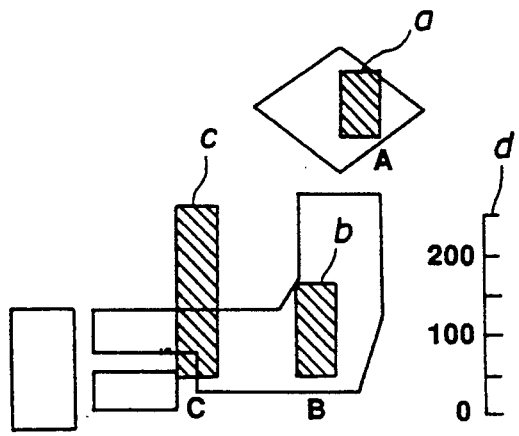
FIG. 23 shows an updated version of a graph of FIG. on the display screen.
FIG. 24 shows updated data in the graph storage area of FIG. 22.

In this way, when the values data object in the graph storage area 43 are updated, the display control unit 24 updates the graph displayed on the screen of the display 3 based on the objects in the graph storage area 43 with a graph as shown in FIG. 23. As will be obvious from FIG. 23, the bar b is changed to a one having a height of a new value "44" and the bar c to a one having a height of a new value "88". Although the heights of the bars b and c are changed, the positions of the bars a, b and c and of the scale d remain unchanged on the map of Japan.

Enlargement and reduction will be described next by way of an example.

Reduction of the bars a, b and c and of the scale d will be here effected in the aspect of display of FIG. 23.

When the input unit 1 is operated to direct reduction of the bars a, b and c and of the scale d to ½, this direction is reported through the processing control unit 21 to the layout changing unit 23, which in response updates the data of FIG. 22 in the graph storage area 43 with the data of FIG. 24. In FIG. 24, the width and height of the bar a in the data object 43-A containing the identifier id1 are updated with values "3" and "16"; the width and height of the bar b in the data object 43-B containing the identifier id2 are updated with values "3" and "22"; the width and height of the bar c in the data object 43-C containing the identifier id3 are updated with values "3" and "44"; the width and height of the scale d in the data object 43-D containing the identifier id4 are updated with values "2" and "50".

Figure 25:
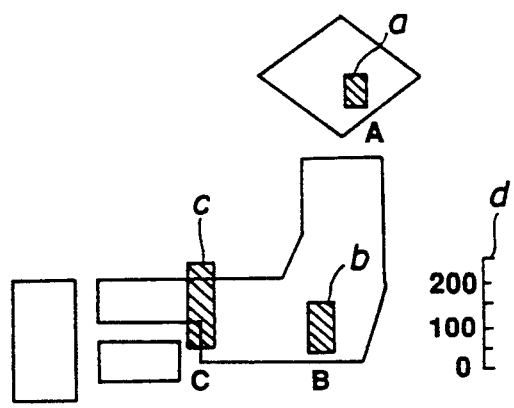
FIG. 25 shows an updated version of a graph of FIG. on the display screen.

Thereafter, the display control unit 24 updates the graph displayed on the screen of the display 3 with a graph of FIG. 25 based on the objects in the graph storage area 43. As will be obvious from FIG. 25, the respective widths and heights of the bars a, b and c and of the scale d are reduced to ½ while the positions of the bars a, b and c and of the scale d remain unchanged on the map of Japan.

As just described above, since in the present embodiment a graph is generated and displayed based on the data in the data storage area 41 and in the layout storage area 42, the data is required to update the data in the layout storage area 42 in order to move the bars and scale which constitute a part of the graph. Update of the data in the data storage area 41 after the movement of the data and scale causes the heights of the bars to change while causing the positions of the bars and scale to remain unchanged. In the reduction of the bars and scale, the positions of the bars and scale remain unchanged. Thus, a desired graph can be generated and edited efficiently.

Figure 26:
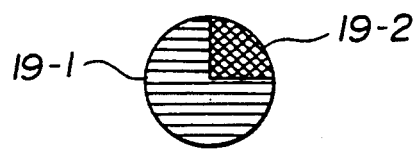
FIG. 26 illustrates a circle graph to which the present invention is applied.
Figure 27:
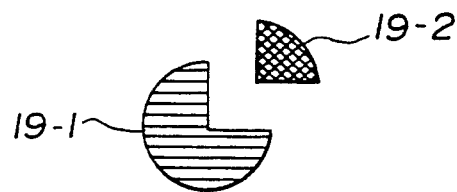
FIG. 27 shows an aspect of display occurring when a sectorial portion constituting a circle graph to which the present invention is applied is moved.
Figure 28:
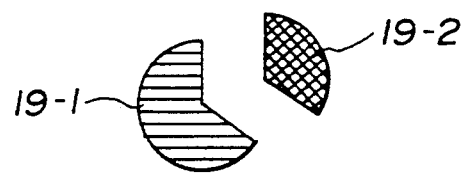
FIG. 28 shows an aspect of display occurring when the angle of a sectorial portion constituting a part of a circle graph to which the present invention is applied is changed.

While the above embodiment illustrates a bar graph, the present invention is not limited to it. The present invention is applicable, for example, to a circle graph such as is shown in FIG. 26. In this case, if the positions of sectorial portions 19-1 and 19-2 as graph elements which constitute the circle graph are entered beforehand, the angles of the sectorial portions 19-1 and 19-2 can be changed as shown in FIG. 28 after the sectorial portion 19-2 is moved as shown in FIG. 27.

Figure 29:
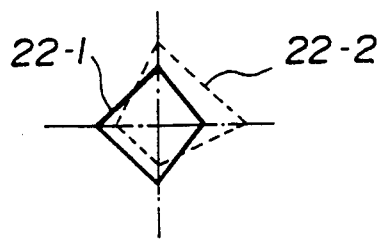
FIG. 29 illustrates a radar chart to which the present invention is applied.
Figure 30:
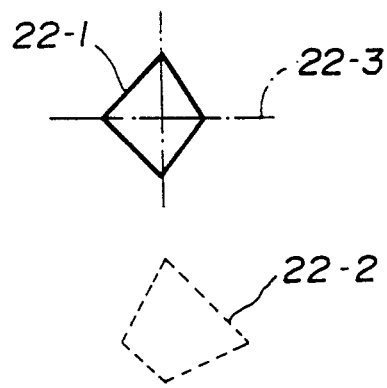
FIG. 30 shows an aspect of display occurring when a characteristic curve constituting a part of the radar chart to which the present invention is applied is moved.
Figure 31:
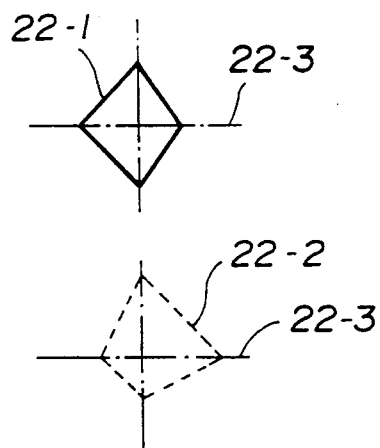
FIG. 31 shows an aspect of display occurring when a coordinate axes constituting a part of the radar chart to which the present invention is applied is copied.
Figure 32:
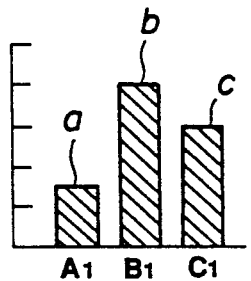
FIG. 32 illustrates a bar graph.
Figure 33:
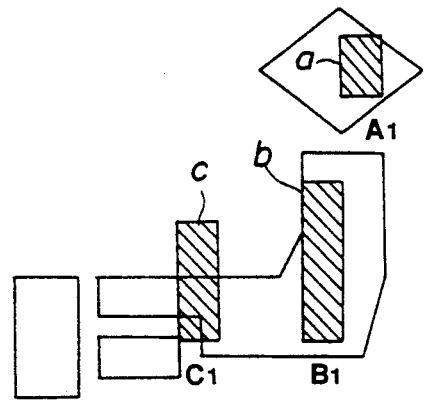
FIG. 33 shows an aspect of display occurring when the bar of the bar graph of FIG. 32 are moved onto a map of Japan.

When the present invention is applied to a radar chart such as is shown in FIG. 29, and the positions of characteristic curves 22-1 and 22-2 are beforehand entered, the curve 22-2 can be moved as shown in FIG. 30 and the curves 22-1, and 22-2 can be changed. When the curve 22-2 is moved, the coordinate axis 22-3 may be copied. In such copying, a new identifier is given to a new element generated by the copying, the position of this element is entered and a new data object of this element is generated. The curves 22-1, 22-2 and the coordinate axis 22-3 are the elements which constitute the radar chart.

As described above, according to the present invention, the numerical data which correspond to the graph elements and any display positions of the graph elements are stored in corresponding relationship, and the numerical data are displayed at the display positions in the form of the display in the graph (for example, in a bar graph or a circle graph), so that even if the numerical data are updated, the updated numerical data can be displayed at the display positions. Thus no time for re-display of the display position of a graph element corresponding to numerical data is required.

The present invention can be carried out in various forms without departing from its spirit and main features. Thus the above embodiments are only illustrative in every respect and should not be construed in a restrictive sense. The scope of the present invention is shown by the attached claims and restricted by the text of the specification. Changes and modifications belonging to the scope of equivalents of the claims are intended to be included in the scope of the present invention.

What is claimed is:

1. A graph generating device which displays a graph on a display unit, said graph comprising a plurality of graph elements, said device having a means for changing the layout of the graph, comprising:
   memory means for storing graph layout data, display position data and display size data corresponding to numerical data for a graph, including said graph elements, said numerical data, graph layout data, said display position data and said display size data stored in the memory means being arranged to correspond to each other;
   display control means for controlling the display unit to display said graph elements on the display unit based on the data stored in the memory means;
   position directing means for directing a new display position of one of the graph elements displayed on the display unit; and
   position update control means for updating display position data stored in the memory means based on the display position directed by the position directing means.

2. A graph generating device with a graph layout changing means according to claim 1, further comprising control means for updating the data in the memory means based on numerical data corresponding to data to be graphed and the graph layout data.

3. A graph generating device with a graph layout changing means according to claim 1, wherein the position directing means indicates a destination position of a graph element so as to direct a new display position of the graph element.

4. A graph generating device according to claim 1, further comprising scale directing means for directing a scale to enlarge or reduce the graph.

5. A graph generating device according to claim 4, further comprising size controlling means for updating the display size data stored in the memory means based on the scale directed by the scale directing means.

6. A graph generating device which displays a graph on a display unit having a means for changing the layout of the graph, said graph having a plurality of graph elements, said device comprising:
   memory means for storing display position data and display size data corresponding to numerical data for each said graph elements constituting a graph, the numerical data, graph layout data, and the display position and display size data stored in the memory means being arranged to correspond to each other;
   display control means for controlling the display unit to display the graph elements on the display unit based on the data stored in the memory means;
   position directing means for directing a new display position of a graph element displayed on the display unit;
   position update control means for updating display position data stored in the memory means based on the display position directed by the position directing means; and
   size directing means for directing new numerical data to change numerical data corresponding to at least one of the graph elements.

7. A graph generating device with a graph layout changing means according to claim 6, wherein the numerical data, graph layout data and the display position and display size data are arranged to correspond to each other based on identification data given to the numerical data.

8. A graph generating device with a graph layout changing means according to claim 6, further comprising size controlling means for updating display size data stored in the memory means based on the new numerical data directed by the size directing means.

9. A graph generating device which displays a graph on a display unit and has a means for changing the layout of the graph, comprising:
   memory means for storing display position data and display size data corresponding to numerical data for each graph element constituting a graph;
   display control means for controlling the display unit to display the graph elements on the display unit based on the data stored in the memory means;
   position directing means for directing a new display position of at least one of the graph elements displayed on the display unit;
   position update control means for updating display position data stored in the memory means based on the display position directed by the position directing means;
   scale directing means for directing the enlargement or reduction of the graph; and
   size controlling means for updating the display size data stored in the memory means based on the scale directed by the scale directing means.

* * * * *